(12) United States Patent
Kumada et al.

(10) Patent No.: US 12,321,542 B2
(45) Date of Patent: Jun. 3, 2025

(54) TOUCH PAD AND ELECTRONIC APPARATUS

(71) Applicant: Lenovo (Singapore) Pte. Ltd., Singapore (SG)

(72) Inventors: Kimio Kumada, Kanagawa (JP); Kazuyuki Kubota, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/760,291

(22) Filed: Jul. 1, 2024

(65) Prior Publication Data
US 2025/0036217 A1    Jan. 30, 2025

(30) Foreign Application Priority Data
Jul. 28, 2023 (JP) .................................. 2023-123099

(51) Int. Cl.
*G06F 3/0354* (2013.01)
*G06F 3/044* (2006.01)

(52) U.S. Cl.
CPC .......... *G06F 3/03547* (2013.01); *G06F 3/044* (2013.01)

(58) Field of Classification Search
CPC ............................. G06F 3/03547; G06F 3/044
See application file for complete search history.

(56) References Cited

U.S. PATENT DOCUMENTS

| | | | | |
|---|---|---|---|---|
| 9,958,907 | B2 * | 5/2018 | Kitamura | G06F 3/03547 |
| 10,401,920 | B2 * | 9/2019 | Kitamura | G06F 3/02 |
| 10,606,377 | B1 * | 3/2020 | Huang | G06F 1/169 |
| 10,747,340 | B2 * | 8/2020 | Tamura | G06F 3/0416 |
| 11,782,530 | B2 * | 10/2023 | Kadowaki | G06F 3/03547 345/174 |
| 12,147,617 | B2 * | 11/2024 | Kadowaki | G06F 3/03545 |
| 2009/0213069 | A1 * | 8/2009 | Kusaka | G06F 3/041 345/157 |
| 2020/0233507 | A1 * | 7/2020 | Tamura | G06F 3/03547 |
| 2022/0404922 | A1 * | 12/2022 | Kadowaki | G06F 3/016 |
| 2023/0418395 | A1 * | 12/2023 | Kadowaki | G06F 3/04142 |
| 2025/0036221 | A1 * | 1/2025 | Kadowaki | G06F 3/04162 |

FOREIGN PATENT DOCUMENTS

| | | |
|---|---|---|
| JP | 2009123205 A | 6/2009 |
| JP | 2009199537 A | 9/2009 |
| JP | 2013008123 A | 1/2013 |
| JP | 2015079400 A | 4/2015 |
| JP | 2017027684 A | 2/2017 |
| JP | 2018060306 A | 4/2018 |

* cited by examiner

*Primary Examiner* — Michael Pervan
(74) *Attorney, Agent, or Firm* — Osha Bergman Watanabe & Burton LLP

(57) ABSTRACT

A touch pad includes: a sensor board capable of recognizing a position of manual contact; a housing to which the sensor board is fixed; a base member supporting the housing in a state of being capable of ascending and descending the housing; and a switch depressed when the sensor board is depressed and the housing is moved toward the base member. The touch pad includes first and second pivot shaft sections provided between the base member and the housing and rotatably supporting the housing in a state of being displaceable in a direction toward the base member. The first and second pivot shaft sections are arranged at positions straddling the switch between the two in a direction from one edge of the sensor board to the other edge on the side opposite to the one edge.

6 Claims, 11 Drawing Sheets

TOUCH PAD AND ELECTRONIC APPARATUS

CROSS-REFERENCE TO RELATED APPLICATIONS

This application claims priority to Japanese Patent Application No. 2023-123099 filed on Jul. 28, 2023, the contents of which are hereby incorporated herein by reference in their entirety.

TECHNICAL FIELD

The present invention relates to a touch pad and an electronic apparatus having the touch pad.

BACKGROUND

For example, a laptop PC has a touch pad used as a substitute for a mouse in addition to a keyboard. The touch pad is a type of pointing device that moves a cursor displayed on a display device in response to a touch operation with a fingertip. The touch pad is generally provided adjacent to the keyboard on the front side of the top surface of a chassis.

Regarding an input device having such a touch pad, the present applicant has proposed a configuration in Japanese Unexamined Patent Application Publication No. 2018-060306 that allows touch operations and depressing operations. In this configuration, a plurality of pseudo button regions are set onto an operation surface of the touch pad, and an input operation corresponding to each button region can be conducted by depressing the touch pad while touching each button region. This touch pad includes a sensor board which detects human contact on the top surface, and a switch depressed by depressing down the sensor board, so that a click feeling is obtained by depressing of the switch.

In the touch pad disclosed in Japanese Unexamined Patent Application Publication No. 2018-060306, a rotating shaft is provided along an edge adjacent to the keyboard, and the sensor board rotates around the rotating shaft to receive a depressing operation. However, in this configuration, although a suitable vertical movement width is ensured on the front side of the sensor board, the deep side near the shaft hardly moves up and down, and a good click feeling cannot be obtained, which may give a user a sense of discomfort.

Further, the electronic apparatus of Japanese Unexamined Patent Application Publication No. 2018-060306 includes a pointing stick approximately in the center of the keyboard. When the touch pad is installed together with the pointing stick, a button region associated with the pointing stick may be set at a position closer to the keyboard. For example, this button region corresponds to three buttons on a mouse. Here, the normal region of the touch pad is assumed to be operated with the index finger or the like. On the other hand, since the above-described button region is operated simultaneously with the pointing stick, it is assumed that the button region will be operated with the thumb, and hence it may be difficult to operate it with a sufficient force.

Thus, there is a demand for the touch pad desired to make a specific region perform a function different from other regions. For example, there is a case in which a three-button function of a mouse is assigned or a case in which a launcher function of a predetermined application is assigned, or the like. In that case, no consideration has heretofore been given to the load of the depressing operation in the specific region, and a further improvement in the operation feeling is desired.

SUMMARY

One or more embodiments of the present invention provide a touch pad capable of improving operability and an electronic apparatus having the touch pad.

A touch pad according to one or more embodiments of the present invention includes a sensor board capable of recognizing a position of manual contact, a housing to which the sensor board is fixed, a base member supporting the housing in a state of being capable of ascending and descending the housing, and a switch depressed when the sensor board is depressed and the housing is moved toward the base member. First and second pivot shaft sections rotatably supporting the housing in a state of being displaceable in a direction toward the base member are provided between the base member and the housing. The first and second pivot shaft sections are arranged at positions straddling the switch between the two in a direction from one edge of the sensor board to the other edge on the side opposite to the one edge. When a region of the sensor board closer to the first pivot shaft section side than the switch is depressed, the second pivot shaft section servers as a rotating shaft and the housing is rotated to depress the switch, thereby generating a first load. When a region of the sensor board closer to the second pivot shaft section side than the switch is depressed, the first pivot shaft section servers as a rotating shaft and the housing is rotated to depress the switch, thereby generating a second load larger than the first load.

An electronic apparatus according to one or more embodiments of the present invention includes a chassis and a touch pad supported by the chassis. The touch pad includes a sensor board capable of recognizing a position of manual contact, a housing to which the sensor board is fixed, a base member supported by the chassis and supporting the housing in a state of being capable of ascending and descending the housing, and a switch depressed when the sensor board is depressed and the housing is moved toward the base member. The touch pad includes first and second pivot shaft sections provided between the base member and the housing and rotatably supporting the housing in a state of being displaceable in a direction toward the base member. The first and second pivot shaft sections are arranged at positions straddling the switch between the two in a direction from one edge of the sensor board to the other edge on the side opposite to the one edge. When a region of the sensor board closer to the first pivot shaft section side than the switch is depressed, the second pivot shaft section servers as a rotating shaft and the housing is rotated to depress the switch, thereby generating a first load. When a region of the sensor board closer to the second pivot shaft section side than the switch is depressed, the first pivot shaft section servers as a rotating shaft and the housing is rotated to depress the switch, thereby generating a second load larger than the first load.

According to one or more embodiments of present invention, it is possible to improve operability.

DETAILED DESCRIPTION OF THE INVENTION

A touch pad according to embodiments of the present invention will hereinafter be described in detail with reference to the accompanying drawings while citing embodiments in relation to an electronic apparatus equipped with the touch pad.

Figure 1:
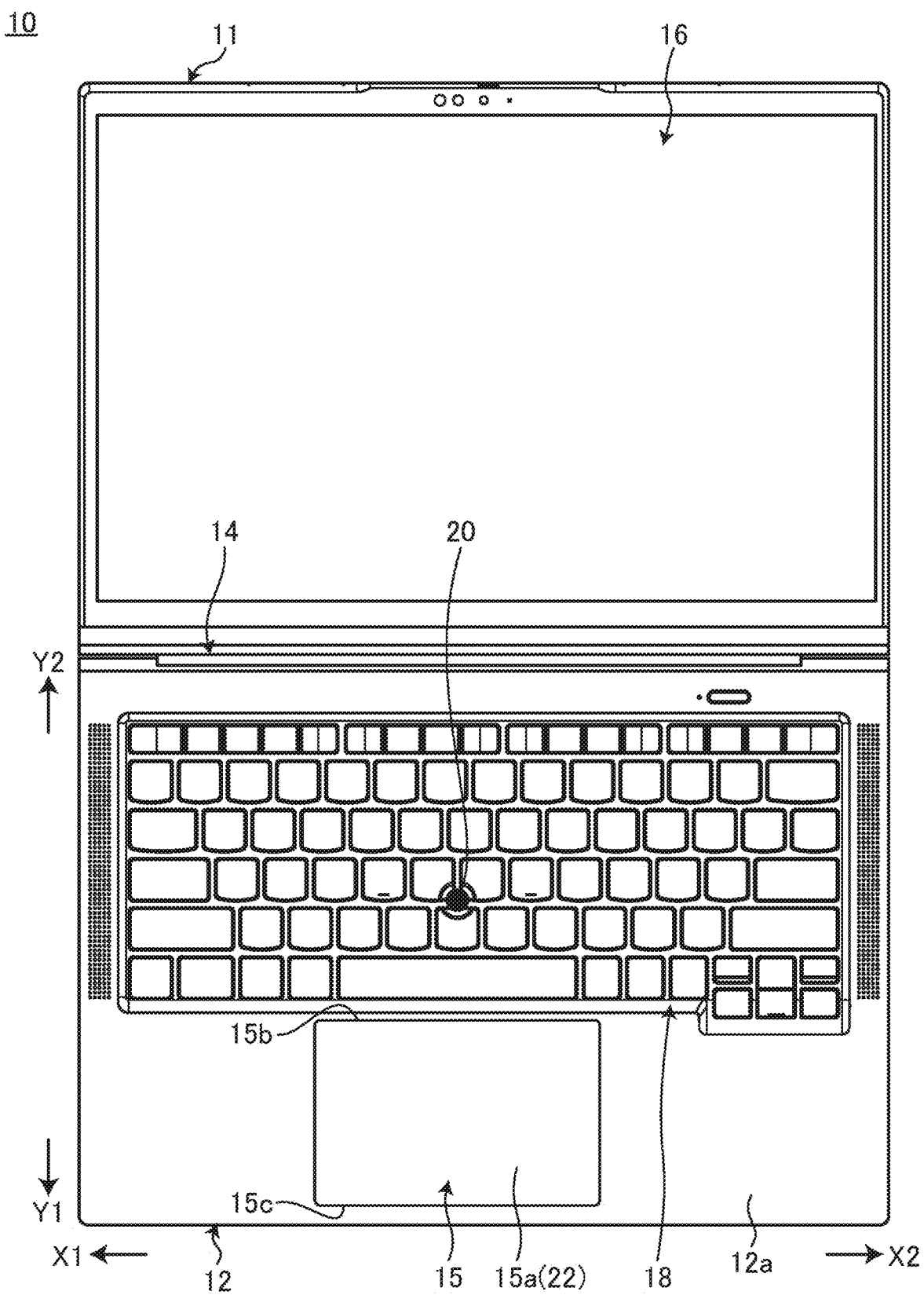
FIG. 1 is a plan view of an electronic apparatus according to one or more embodiments as viewed from above.

FIG. 1 is a plan view of a lid 11 of an electronic apparatus 10 according to one or more embodiments as viewed from above with the lid 11 opened from a chassis 12. In one or more embodiments, the electronic apparatus 10 is a clamshell laptop PC in which the lid 11 and the chassis 12 are connected to each other so as to be relatively rotatable by a hinge 14. The chassis 12 is provided with a touch pad 15 according to one or more embodiments. Electronic apparatuses to which the touch pad 15 is applicable are not limited to laptop PCs. The electronic apparatus may be, for example, a single keyboard device externally attached to a laptop PC, a desktop PC, a tablet PC, or the like. The touch pad 15 can also be used as a single touch pad device externally attached to an electronic apparatus such as a laptop PC.

The lid 11 is a flat box body. The lid 11 is equipped with a display 16. The display 16 is, for example, an organic EL or a liquid crystal. The lid 11 is connected to a rear end (Y2 side end) of the chassis 12 by the hinge 14.

The chassis 12 is a flat box body. Various electronic components such as a motherboard with a CPU or the like mounted thereon, a storage, a memory, a battery, etc. are housed in the chassis 12. The touch pad 15 and a keyboard 18 are arranged forward and backward on an upper surface 12a of the chassis 12.

A pointing stick 20 is provided substantially in the center of the keyboard 18. The pointing stick 20 is a type of pointing device which moves a cursor displayed on the display 16 in a tilting direction. The pointing stick 20 has a small cylindrical shape and is provided approximately at the center of the keyboard 18, for example, between the G, H, and B keys. The pointing stick 20 moves the cursor mainly by performing a tilting operation with the index finger or middle finger. Regarding clicking to specify a point when operating the cursor with the pointing stick 20, the touch pad 15 is mainly depressed with the thumb.

Next, the touch pad 15 will be described.

Hereinafter, based on the usage forms of the touch pad 15 in a state of being installed in the electronic apparatus 10, the width direction (left and right directions), the depth direction (front and rear directions), the thickness direction (vertical direction) will be referred to as X1 and X2 directions, Y1 and Y2 directions, and Z1 and Z2 directions for explanation, respectively. The X1 and X2 directions may be collectively referred to as the X direction. The Y1 and Y2 directions and the Z1 and Z2 directions may also be called the Y direction and the Z direction in like manner.

The touch pad 15 is provided approximately at the center of a palm rest region on the Y1 side of the keyboard 18 on the upper surface 12a of the chassis 12. The touch pad 15 is adjacent front and back to the keyboard 18. The center of the touch pad 15 in the X direction substantially coincides with the pointing stick 20. The touch pad 15 is a rectangle which is horizontally elongated in the X direction, and its width in the Y direction occupies approximately the entire width of the palm rest region.

The touch pad 15 is a pointing device which performs a pointing operation to move the cursor manually (including a fingertip, a pen tip, etc.). The touch pad 15 is designed so that by depressing down a sensor board 22 on its surface, an internal switch 30 is switched to obtain a click feeling (refer to FIGS. 7A through 7D). The sensor board 22 is capable of recognizing a contact position of a human hand. The touch pad 15 allows processing such as so-called right and right clicks depending on the position of the human hand when the sensor board 22 is depressed down. The touch pad 15 can also handle various operations such as tap, double tap, two-finger tap, and pinch through software processing.

Figure 2:
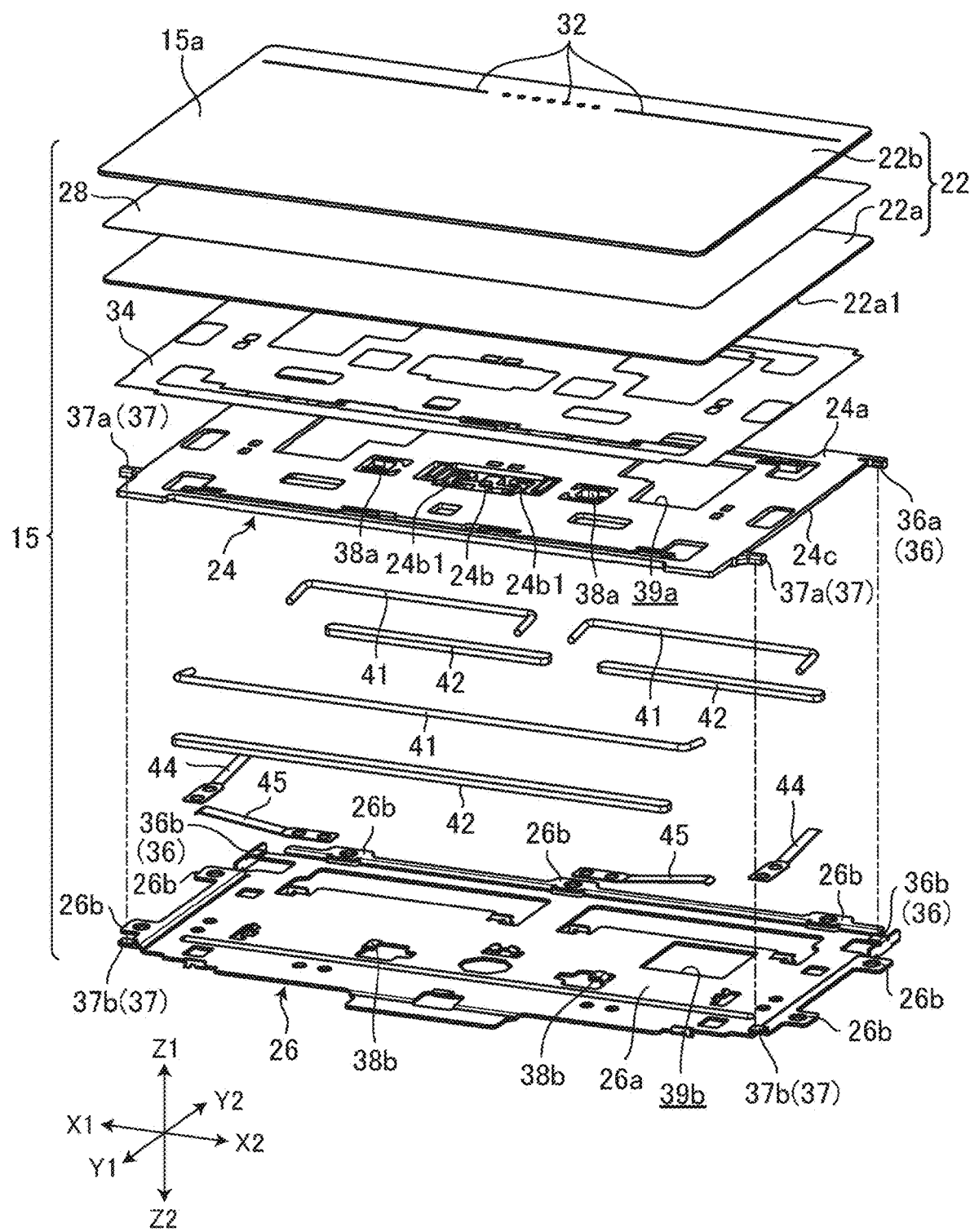
FIG. 2 is an exploded perspective view of a touch pad.
Figure 3:
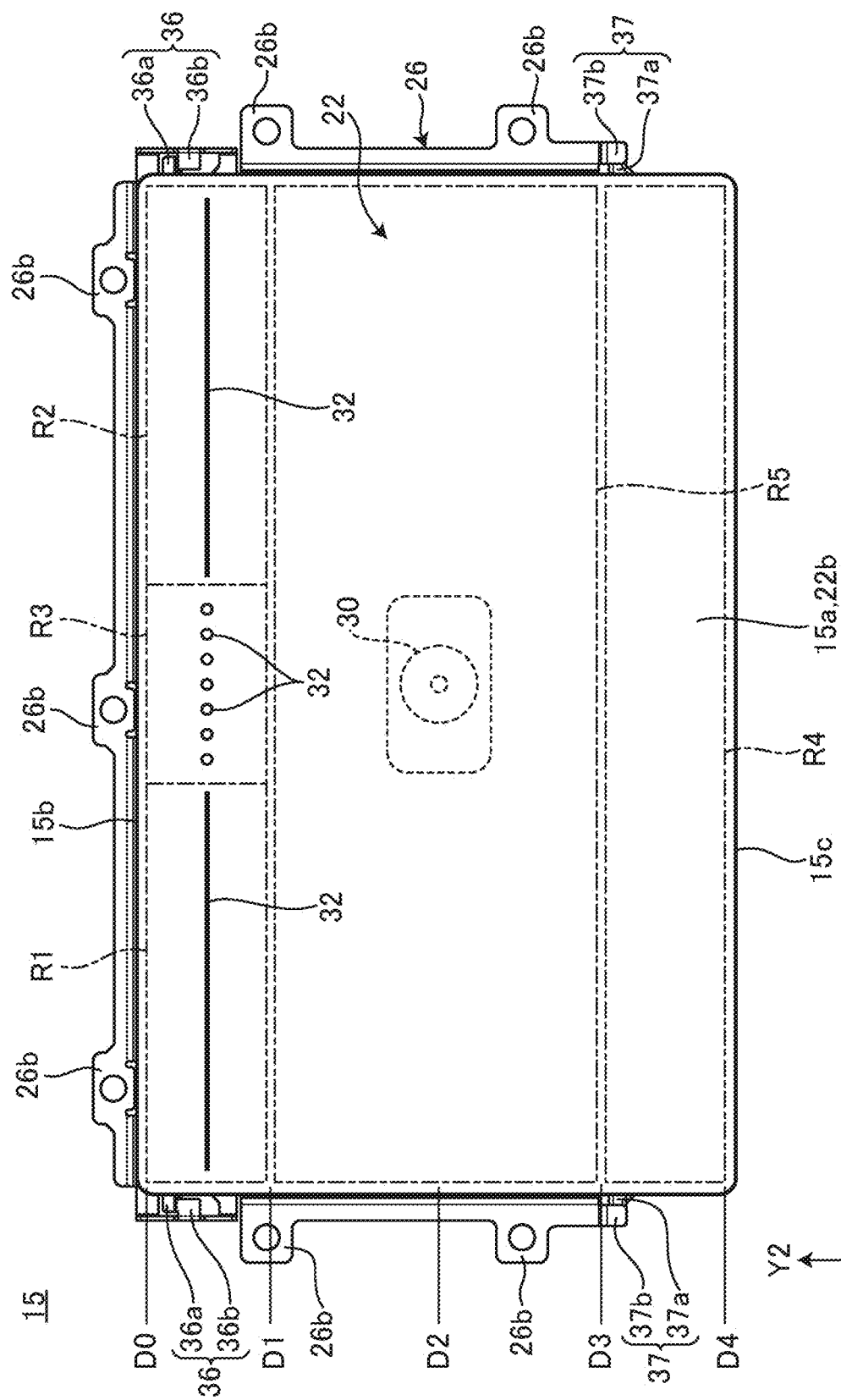
FIG. 3 is a plan view of the touch pad.
Figure 4:
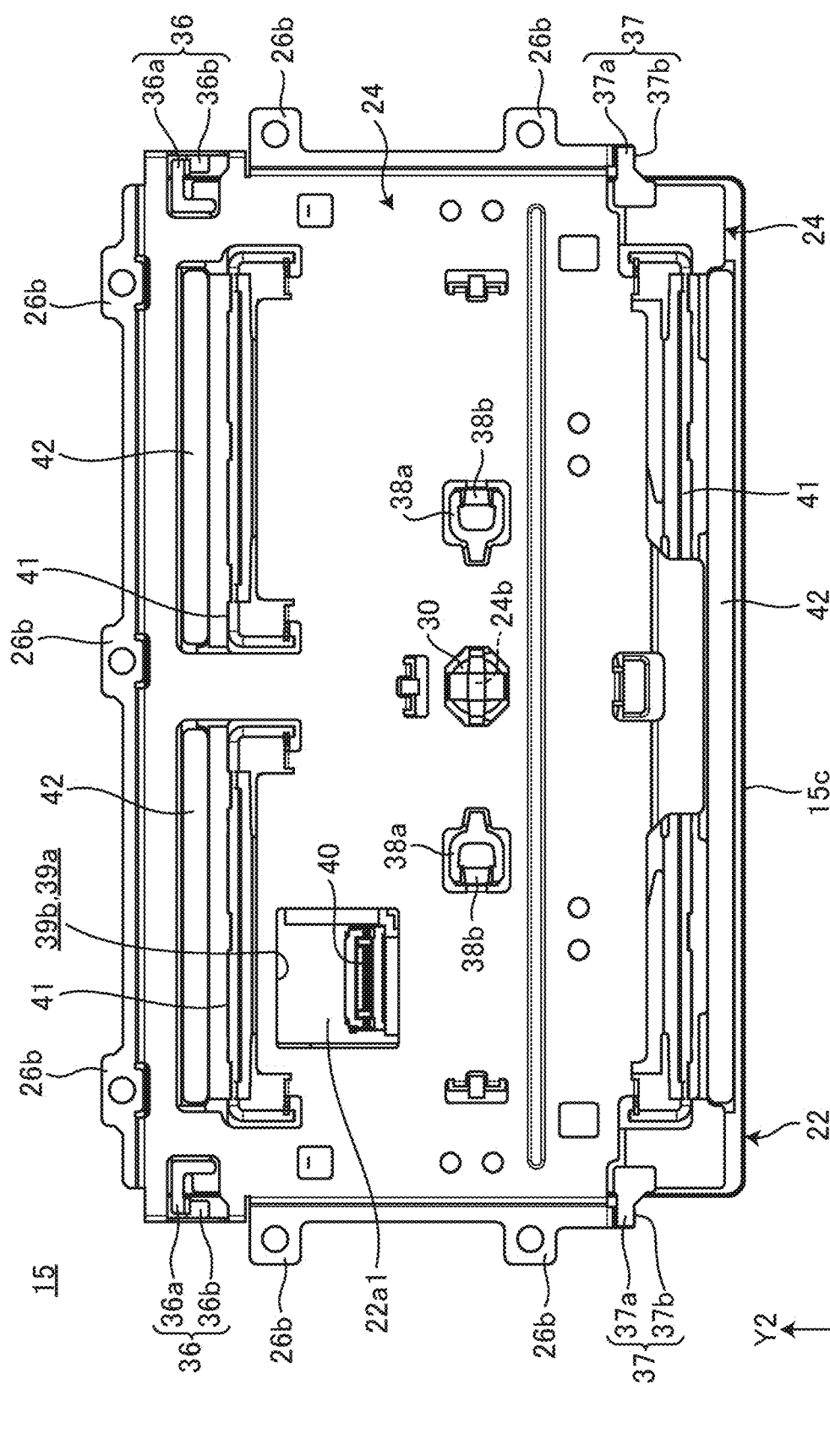
FIG. 4 is a bottom view of the touch pad.

FIG. 2 is an exploded perspective view of the touch pad 15. FIG. 3 is a plan view of the touch pad 15. FIG. 4 is a bottom view of the touch pad 15.

As illustrated in FIGS. 2 through 4, the touch pad 15 includes, in order from the Z1 side to the Z2 side, a sensor board 22, a housing 24, and a base member 26.

The sensor board 22 is arranged so as to face the upper surface 12a of the chassis 12 and receives and detects user input operations. The sensor board 22 has a structure in which a pad plate 22b is laminated on the Z1 side surface of a substrate 22a. The substrate 22a has a sensing function such as an electrostatic capacitive type and is capable of detecting various input operations to the touch pad 15. The pad plate 22b is, for example, a glass plate, and its surface serves as an operation surface 15a of the touch pad 15. The pad plate 22b is fixed to the surface of the substrate 22a with an adhesive member 28 such as an adhesive, a pressure-sensitive adhesive, or a double-sided sticky tape.

Figure 7A:
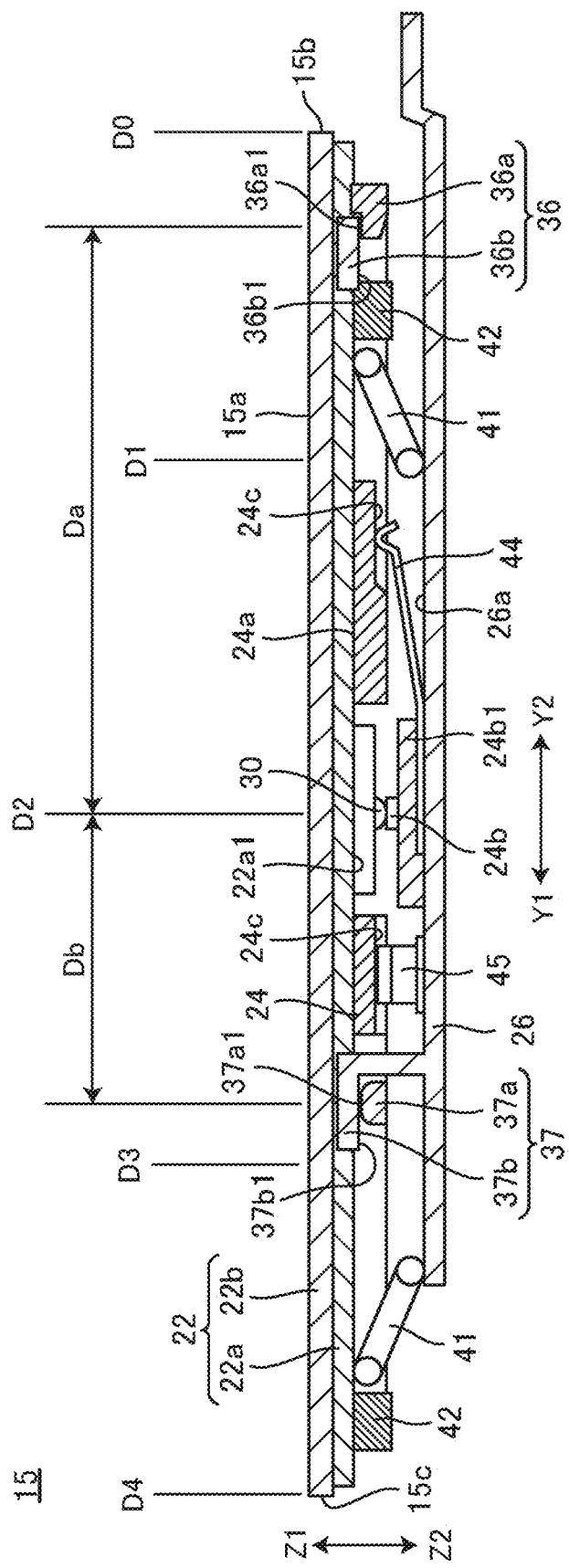
FIG. 7A is a schematic cross-sectional side view of the touch pad.

A switch 30 is installed approximately in the center of the Z2 side surface (lower surface 22a1) of the substrate 22a (refer also to FIG. 7A). As the switch 30, a thin and small one may be used. In one or more embodiments, a dome-shaped switch called a metal dome switch is used. When the switch 30 is depressed, it is turned on and off and provides a moderate click feeling. The switch 30 in one or more embodiments is a normal open type.

As illustrated in FIG. 3, a plurality of regions R1 to R5 are assigned to the operation surface 15a of the sensor board 22. The regions R1 to R5 have ranges which are defined by coordinates on the operation surface 15a and are not visible. The regions R1 to R5 are assigned each click with a general mouse as will be described later. When the sensor board 22 is depressed while touching any of the regions R1 to R5, the assigned processing or display is performed.

The regions R1 to R3 are band-shaped regions extending in the X direction along the Y2 side edge (edge 15b) of the operation surface 15a adjacent to the keyboard 18, and are arranged in the X direction. The regions R1 to R3 are button regions. The button regions R1 to R3 are assigned functions associated with the pointing stick 20, for example, the functions of three mouse buttons. The slightly wide left and right button regions R1 and R2 correspond to left and right clicks, respectively. The central narrow button region R3 corresponds to scrolling and is used to scroll a Web page or a document in any direction. The button regions R1 to R3 are operated mainly with the thumb in combination with the pointing stick 20. The button regions R1 to R3 are clearly indicated by marks 32 made of straight lines, dots, etc. printed on the operation surface 15a and are separated from other regions R4 and R5.

The region R4 is a band-shaped region extending in the X direction along the side opposite to the button regions R1 to R3, i.e., along the Y1 side edge (edge 15c) of the operation surface 15a. The region R4 is a click region. The click region R4 is assigned a left click of the mouse. For the click region R4, a right click of the mouse can also be further assigned to a predetermined range including the X2 side end thereof. The wide region R5 sandwiched between the button regions R1 to R3 and the click region R4 is a click region to which the same function as the region R4 is assigned.

As illustrated in FIGS. 2 through 4, the housing 24 is a plate-shaped member formed of a resin. The housing 24 supports the sensor board 22. The Z1 side surface (upper surface 24a) of the housing 24 is fixed to the lower surface 22a1 of the substrate 22a using an adhesive member 34 similar to the adhesive member 28 described above. Thus, the housing 24 constitutes a stacked body integrated with the sensor board 22.

The housing 24 is supported with a predetermined gap in the Y direction with respect to the base member 26 so as to be movable up and down. More specifically, the housing 24 is supported to be rotatable relative to the base member 26 and to be displaceable in the Z direction as a whole. Therefore, the sensor board 22 fixed to the housing 24 is also supported rotatably and displaceably with respect to the base member 26. The housing 24 is rotated and displaced with respect to the base member 26 by a two-axis pivot structure with two pivot shaft sections 36 and 37 arranged in the Y direction. The configuration of the pivot shaft sections 36 and 37 will be described later.

The housing 24 has a pressing part 24b approximately in the center thereof, which overlaps the switch 30 in the Y direction. The pressing part 24b includes a circular protrusion which protrudes in the Z1 direction. The pressing part 24b is supported by a plate constituting the housing 24 via meandering left and right leaf springs 24b1 so as to be elastically displaceable in a double-holding manner. The pressing part 24b is arranged at a position slightly lower toward the Z2 side than the lower surface 24c of the housing 24 as a whole due to the leaf springs 24b1. The Z2 side surface of the leaf spring 24b1 contacts the Z1 side surface (upper surface 26a) of the base member 26 (refer to FIG. 7A). Thus, when the sensor board 22 is depressed and rotated or displaced toward the base member 26, the pressing part 24b is elastically displaced in the Z1 direction as the housing 24 approaches the base member 26, so that the switch 30 is depressed.

The housing 24 is further provided with cutout shapes, protrusions, holes, etc. at various locations. For example, a pair of latches 38a which are approximately V-shaped in plan view are respectively engaged with substantially L-shaped hooks 38b cut and raised on the upper surface 26a of the base member 26. The latches 38a and the hooks 38b define the upper limit of movement of the housing 24 from the base member 26 toward the Z1 side and at the same time prevent the housing 24 from coming off. For example, a hole 39a communicates with a hole 39b of the base member 26 in the Z direction and allows a connector 40 mounted on the lower surface 22a1 of the substrate 22a to be inserted therein. The connector 40 is connected to a motherboard or the like in the chassis 12 using prescribed wiring.

Reference numeral 41 in FIG. 2 is a stabilizer interposed between the housing 24 and the base member 26. The stabilizer 41 is, for example, a member made of a stainless-steel thin rod with both ends thereof bent. The stabilizer 41 is a stabilizer which stabilizes the forces in the left and right width directions of the sensor board 22 and the housing 24 and suppresses twisting and tilting thereof. Reference numeral 42 in FIG. 2 is a reinforcing member fixed to the lower surface 22a1 of the substrate 22a. The reinforcing member 42 is, for example, a thin square bar made of stainless steel. The reinforcing member 42 suppresses twisting and bending when the sensor board 22 is depressed.

As illustrated in FIGS. 2 through 4, the base member 26 is a plate-shaped member made of a metal such as stainless steel. The base member 26 supports the housing 24 on its upper surface 26a side so as to be movable up and down. The base member 26 is also a bracket which attaches the touch pad 15 to the chassis 12. The base member 26 has mounting pieces 26b in which mounting holes are formed in each of the left and right edges along the Y direction and each of the edges along the X direction along on the Y2 side. The mounting pieces 26b are appropriately screwed to the housing 12 using the mounting holes. Note that in addition to the above-described hooks 38b and hole 39b, the base member 26 is provided with cutout shapes, cut rises, holes, etc. at various locations.

Next, a configuration for rotating and displacing the housing 24 relative to the base member 26 will be described.

Figure 5A:
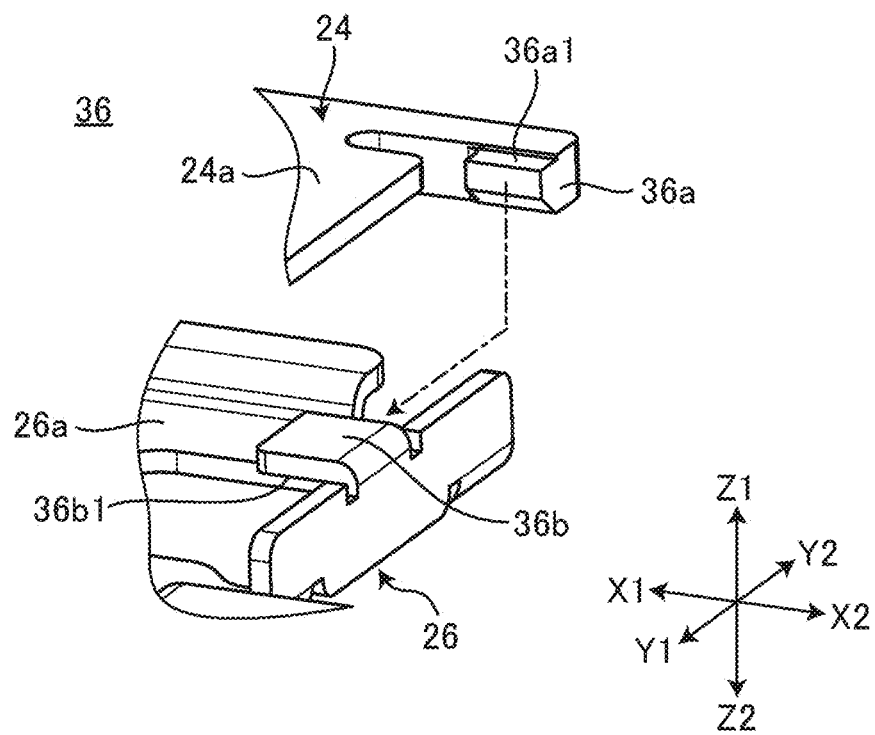
FIG. 5A is an exploded perspective view of a pivot shaft section 36 installed on the Y2 side of the touch pad and its peripheral portion as viewed from the Z1 side.
Figure 5B:
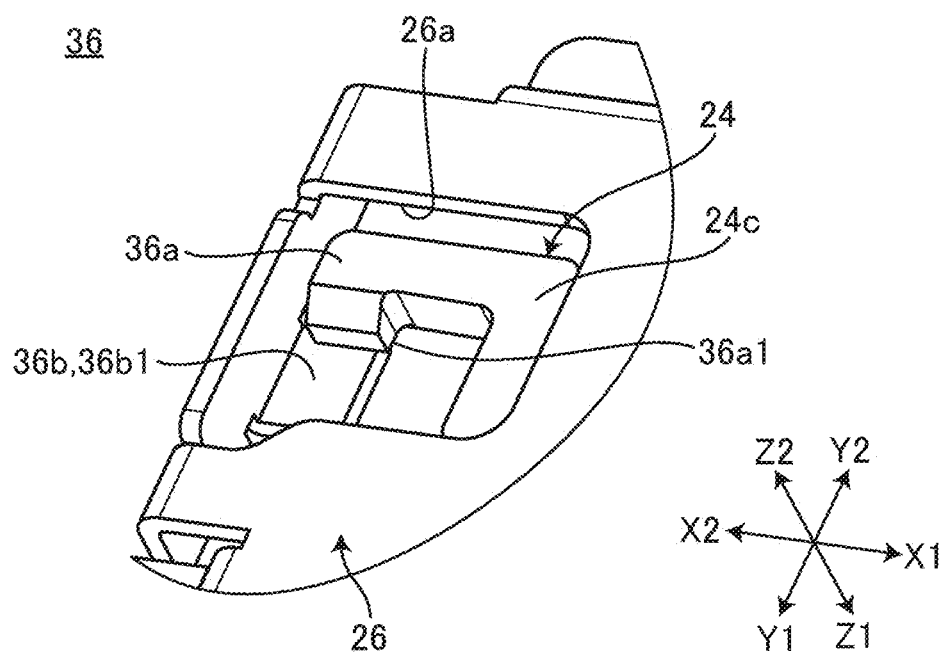
FIG. 5B is a perspective view of the pivot shaft section and its peripheral portion illustrated in FIG. 5A as viewed from the Z2 side.
Figure 6A:
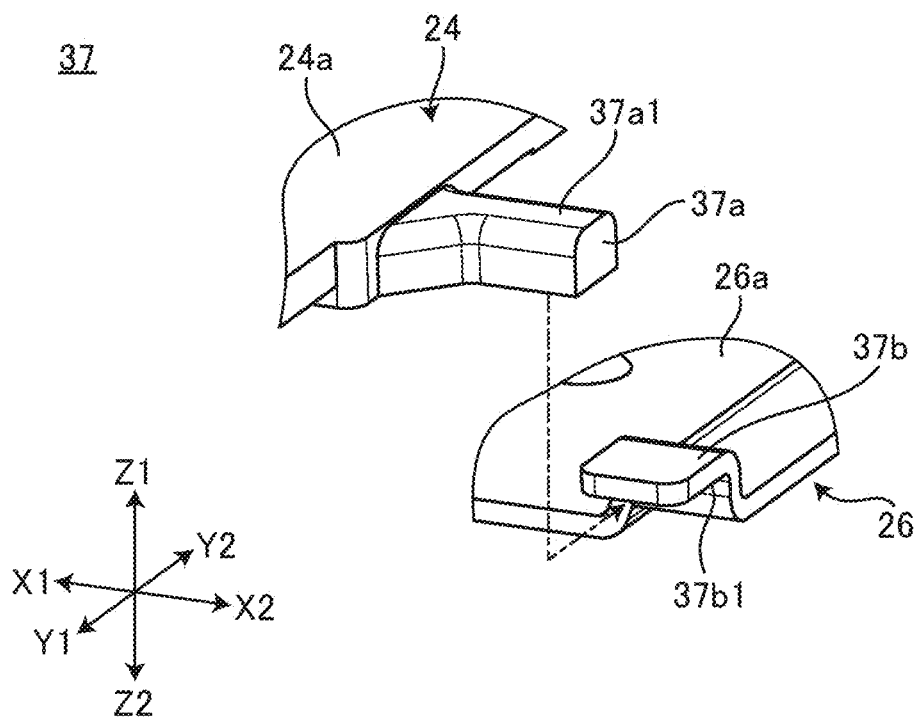
FIG. 6A is an exploded perspective view of a pivot shaft section installed on the Y1 side of the touch pad and its peripheral portion as viewed from the Z1 side.
Figure 6B:
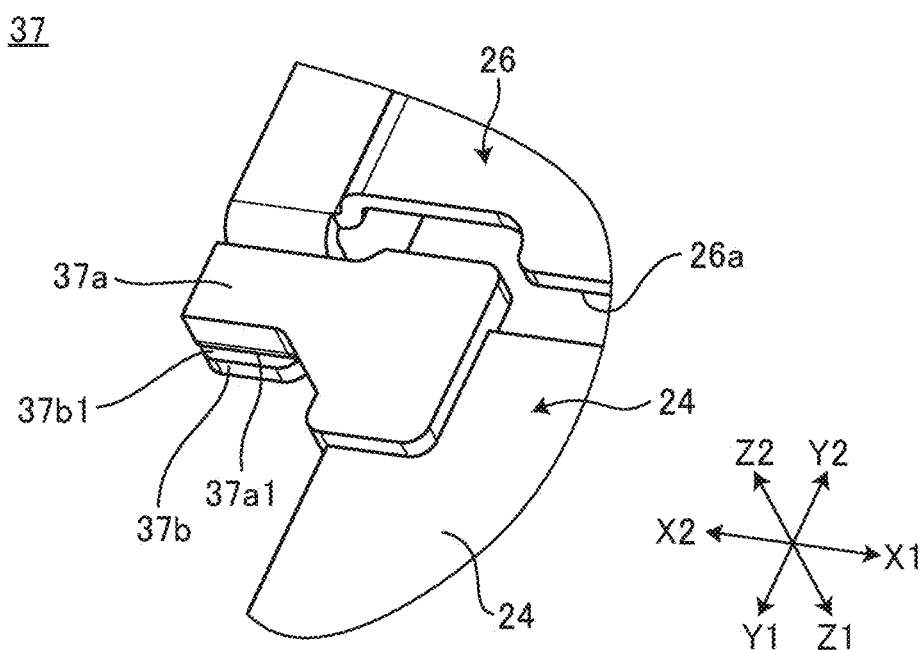
FIG. 6B is a perspective view of the pivot shaft section and its peripheral portion illustrated in FIG. 6A as viewed from the Z2 side.

FIG. 5A is an exploded perspective view of the pivot shaft section 36 installed on the Y2 side of the touch pad 15 and its peripheral portion as viewed from the Z1 side. FIG. 5B is a perspective view of the pivot shaft section 36 and its peripheral portion illustrated in FIG. 5A as viewed from the Z2 side. FIG. 6A is an exploded perspective view of the pivot shaft section 37 installed on the Y1 side of the touch pad 15 and its peripheral portion as viewed from the Z1 side. FIG. 6B is a perspective view of the pivot shaft section 37 and its peripheral portion illustrated in FIG. 6A as viewed from the Z2 side. FIG. 7A is a schematic cross-sectional side view of the touch pad 15.

As illustrated in FIGS. 2 through 7A, the touch pad 15 according to one or more embodiments includes the two pivot shaft sections 36 and 37 which rotatably support the housing 24 while allowing it to be displaced in the direction toward the base member 26. The pivot shaft sections 36 are provided in a pair on the left and right sides at both edges of the touch pad 15 in the X direction, thereby forming rotating shafts extending in the X direction. The pivot shaft sections 37 are also provided in a pair on the left and right sides at both edges of the touch pad 15 in the X direction, thereby forming rotating shafts extending in the X direction. Each of the pivot shaft sections 36 and 37 may each have a structure elongated in the X direction, and, for example, one may be provided at each position including the center of the touch pad 15 in the X direction.

The pivot shaft sections 36 and 37 are arranged in the Y direction from the edge 15b on the Y2 side of the sensor board 22 to the edge 15c on the opposite side (Y1 side) at a position straddling the switch 30 between them. One pivot shaft section 36 is arranged closer to the edge 15b than the switch 30 based on the Y direction. The other pivot shaft section 37 is arranged closer to the edge 15c than the switch 30.

As illustrated in FIGS. 2, 5A, 5B, and 7A, one pivot shaft section 36 (first pivot shaft section) is constituted of a shaft 36a and a bearing part 36b.

The shafts 36a protrude outward from the left and right edges of the housing 24 along the Y direction respectively. That is, the shaft 36a of the pivot shaft section 36 on the X1 side protrudes in the X1 direction, and the shaft 36a of the pivot shaft section 36 on the X2 side protrudes in the X2 direction. The shaft 36a is rectangular substantially in cross section, for example. The shaft 36a is provided with a protrusion protruding toward the Y2 side at its tip, and the Z1 side surface (upper surface) of this protrusion becomes a contact surface 36a1 with respect to the bearing part 36b. The corner of the surface opposite to the contact surface 36a1 in the Z direction is chamfered. The shaft 36a may have a circular shape in cross section or the like. The contact surface 36a1 may protrude to the Y2 side.

Each of the bearing parts 36b is formed of a plate piece extending along the XY direction in which the upper end of a vertical wall cut up toward the Z1 side from the edge of the base member 26 along the Y direction is bent inward. That is, the bearing part 36b of the pivot shaft section 36 on the X1 side is bent so as to face the X2 direction, and the bearing part 36b of the pivot shaft section 36 on the X2 side is bent so as to face the X1 direction. In the bearing part 36b, the Z2 side surface (lower surface) thereof serves as a support surface 36b1 for the shaft 36a.

In such a pivot shaft section 36, the shaft 36a is locked from below to the bearing part 36b, and the contact surface 36a1 abuts on the support surface 36b1. Thus, the pivot shaft section 36 is supported so that the shaft 36a can rotate relative to the bearing part 36b and can be displaced in the Z2 direction. That is, the housing 24 and the sensor board 22 are supported by the pivot shaft sections 36 so as to be rotatable relative to the base member 26 and displaceable in the Z2 direction.

As illustrated in FIGS. 2, 6A, 6B, and 7A, the other pivot shaft section (second pivot shaft section) 37 is constituted of a shaft 37a and a bearing part 37b.

The shafts 37a protrude outward from the left and right edges of the housing 24 along the Y direction respectively. That is, the shaft 37a of the pivot shaft section 37 on the X1 side protrudes in the X1 direction, and the shaft 37a of the pivot shaft section 37 on the X2 side protrudes in the X2 direction. The shaft 37a has a radiused shape at the corner of the Z1 side surface and has a semicylindrical shape substantially in cross section. In the shaft 37a, the Z1 side surface (upper surface) thereof on which such a radiused shape is formed at both ends in the Y direction becomes a contact surface 37a1 with respect to the bearing part 37b. The shaft 37a may have a circular shape in cross section or the like.

Each of the bearing parts 37b is formed of a plate piece along the XY direction in which a vertical wall having some width in the X direction is cut and raised toward the Z1 side at the edge along the Y direction of the base member 26, and the upper end thereof is bent in the Y1 direction. That is, the bearing parts 37b of the pivot shaft sections 37 on the X1 and X2 sides are both bent so as to face in the Y1 direction. In the bearing part 37b, the Z2 side surface (lower surface) serves as a support surface 37b1 for the shaft 37a.

In such a pivot shaft section 37, the shaft 37a is locked from below to the bearing part 37b, and the contact surface 37a1 abuts on the support surface 37b1. Thus, the pivot shaft section 37 is supported so that the shaft 37a can rotate relative to the bearing part 37b and can be displaced in the Z2 direction. That is, the housing 24 and the sensor board 22 are supported even by the pivot shaft section 37 so as to be rotatable relative to the base member 26 and displaceable in the Z2 direction. The pivot shaft section 37 may have the same or similar configuration as the pivot shaft section 36. Conversely, the pivot shaft section 36 may have the same or similar configuration as the pivot shaft section 37.

Figure 7B:
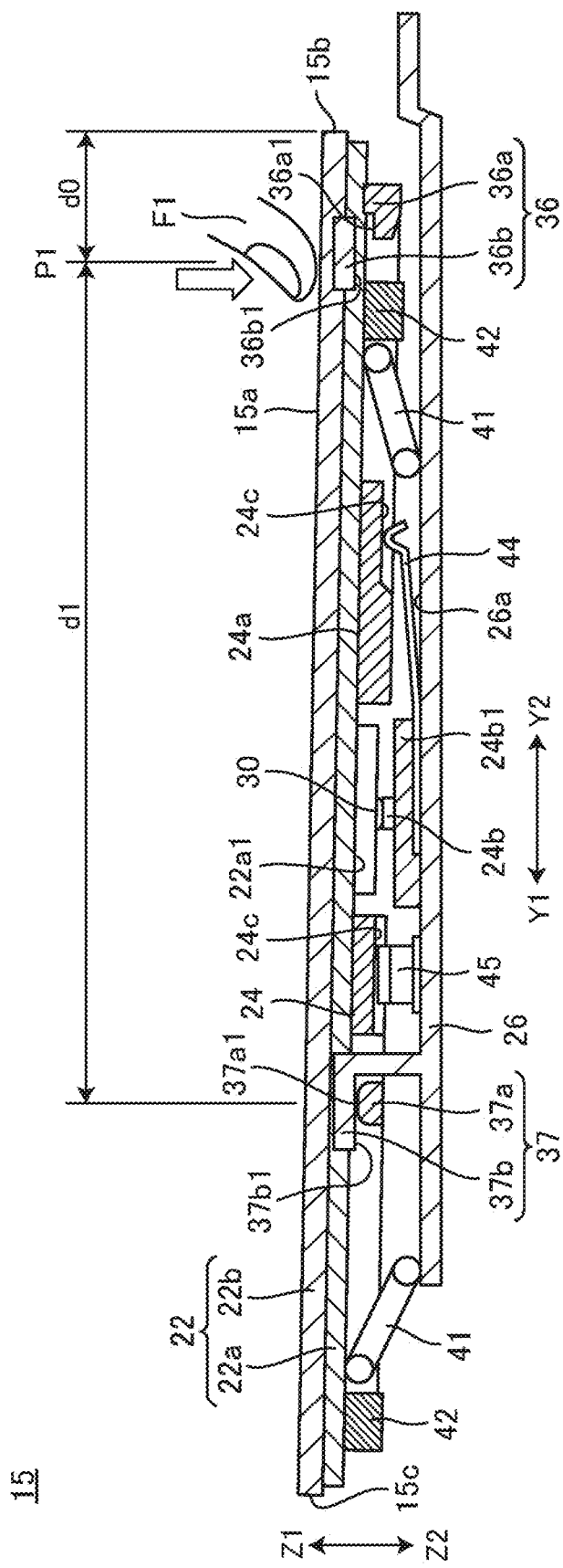
FIG. 7B is a cross-sectional side view illustrating the operation when a predetermined position is depressed from the state illustrated in FIG. 7A.
Figure 7C:
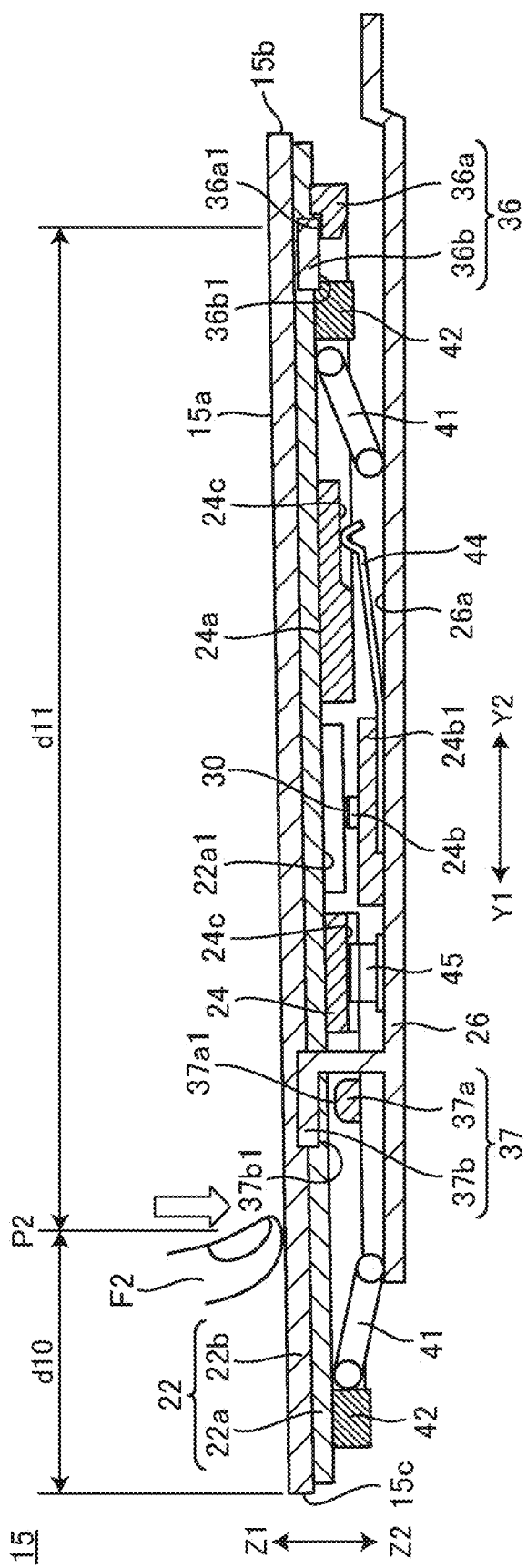
FIG. 7C is a cross-sectional side view illustrating the operation when a predetermined position is depressed from the state illustrated in FIG. 7A.

As described above, the sensor board 22 and the housing 24 can rotate (tilt) relative to the base member 26 with the two pivot shaft sections 36 and 37 arranged astride the switch 30 in the Y direction as rotating shafts (refer to FIGS. 7B and 7C). Further, the sensor board 22 and the housing 24 are also capable of translational displacement movements along the Z direction as a whole without having both the pivot shaft sections 36 and 37 act as rotating shafts with respect to the base member 26 (refer to FIG. 7C).

As illustrated in FIGS. 2 and 7A, the touch pad 15 in one or more embodiments further includes two types of elastic members 44 and 45 respectively provided in pairs between the housing 24 (or sensor board 22) and the base member 26. The elastic members 44 and 45 are auxiliary parts for adjusting the load during depressing operations in regions R1 to R5 to be described later. The number and arrangement of the auxiliary parts installed can be changed as appropriate. One or both of the elastic members 44 and 45 may be omitted when such load adjustment is unnecessary.

The elastic members 44 are, for example, strip-shaped plate springs extending along the Y direction, and are provided near the left and right edges of the upper surface 26a of the base member 26, respectively. In the elastic member 44, the Y1 side end thereof is fixed to the upper surface 26a, and the Y2 side distal end which extends diagonally upward abuts on the lower surface 24c of the housing 24. The elastic members 45 are, for example, strip-shaped plate springs extending along the X direction, and are provided side by side on the left and right sides near the Y1 side edge of the upper surface 26a. The elastic member 45 has an end close to the center of the upper surface 26a in the X direction, which is fixed to the upper surface 26a of the base member 26, and a distal end extending diagonally upward, which abuts on the lower surface 24c of the housing 24. Thus, the elastic members 44 and 45 respectively constantly urge the housing 24 in the Z1 direction to separate the housing 24 from the base member 26 with a desired load. The elastic members 44 and 45 may provide a bias between the base member 26 and the sensor board 22 through holes formed in the housing 24, for example.

Next, the operation and effects when depressing down the sensor board 22 will be described.

Figure 7D:
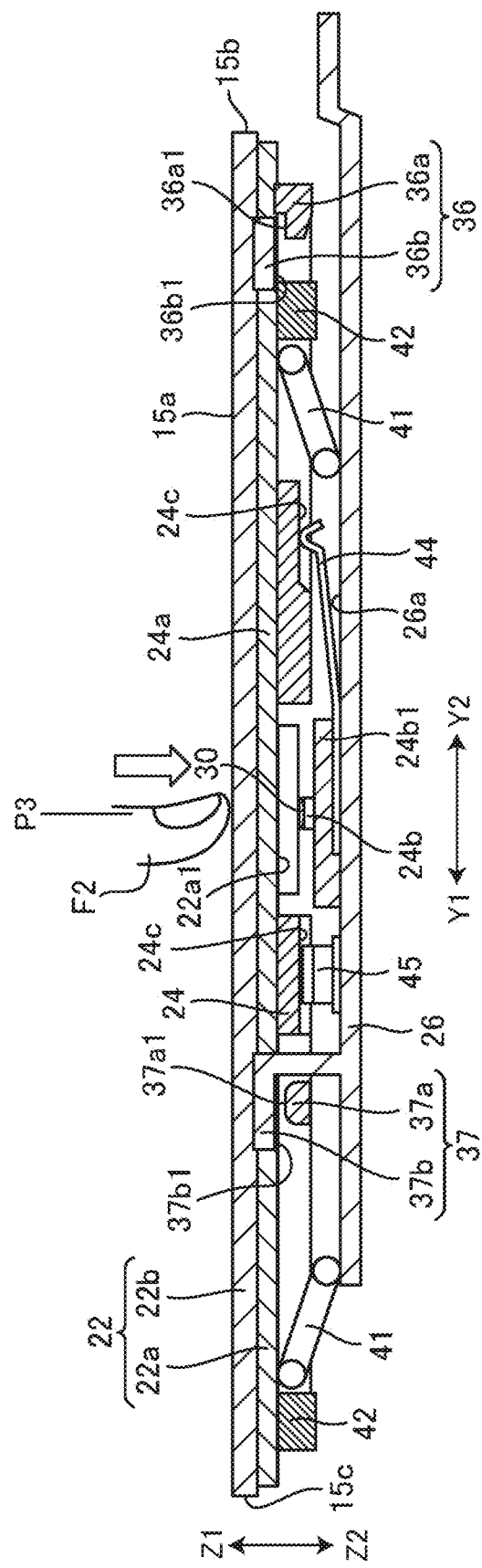
FIG. 7D is a cross-sectional side view illustrating the operation when a predetermined position is depressed from the state illustrated in FIG. 7A.
Figure 8:
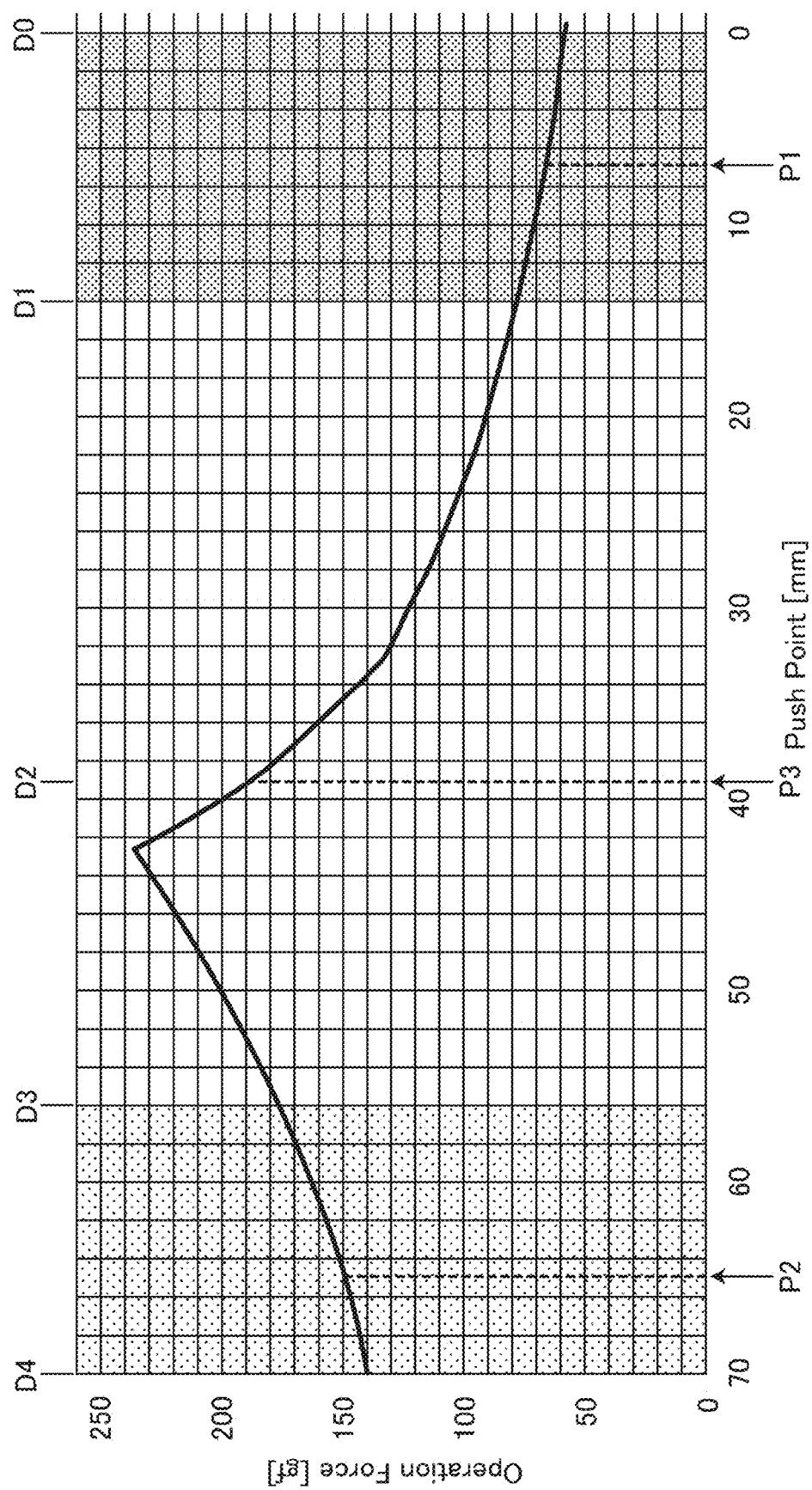
FIG. 8 is a graph illustrating an example of a load generated by the touch pad when each position in a Y direction of a sensor board is depressed.

FIG. 7B is a cross-sectional side view illustrating the operation when a predetermined position P1 included in the regions R1 to R3 is depressed from the state illustrated in FIG. 7A (non-load state). FIG. 7C is a cross-sectional side view illustrating the operation when a predetermined position P2 included in the region R4 is depressed from the state illustrated in FIG. 7A. FIG. 7D is a cross-sectional side view illustrating the operation when a predetermined position P3 included in the region R5 is depressed from the state illustrated in FIG. 7A. FIG. 8 is a graph illustrating an example of a load (reaction force from the touch pad 15 against the human hand) generated by the touch pad 15 when each position in the Y direction of the sensor board 22 is depressed.

In FIG. 8, the horizontal axis indicates depressed position (mm) of the sensor board 22 in the Y direction. The dimension of the sensor board 22 of one or more embodiments in the Y direction is, for example, 70 mm. Therefore, the horizontal axis of FIG. 8 indicates the distance from the edge 15b on the Y2 side of the sensor board 22 to the edge 15c on the Y1 side, which is 70 mm away from the Y2 side edge 15b taken as 0 mm. The vertical axis indicates a load generated by the touch pad 15 when the sensor board 22 is depressed at each position shown on the horizontal axis, that is, an operating load (gf) required to turn on the switch 30 at each position.

D0 to D4 in FIG. 8 correspond to D0 to D4 in FIGS. 3 and 7A respectively and indicate the straight-line distance for each region R1 to R5 in the Y direction from the edge 15b to the edge 15c. That is, the distance D0 to D1 indicates the distance in the Y direction of the regions R1 to R3, the distance D1 to D2 indicates the distance in the Y direction from the region R1 to the switch 30, the distance D2 to D3 indicates the distance in the Y direction from the switch 30 to the region R5, and the distance D3 to D4 indicates the distance in the Y direction of the region R4. As illustrated in FIG. 8, in one or more embodiments, for example, the distance D0 to D1 in the Y direction of the regions R1 to R3 is approximately 15 mm, the distance D0 to D2 in the Y direction from the edge 15b to the switch 30 is approximately 40 mm, the distance D0 to D3 in the Y direction from the edge 15b to the region R4 is approximately 55 mm, and the distance D0 to D4 in the Y direction from the edge 15b to the edge 15c is 70 mm.

Further, in one or more embodiments, for example, the distance Da in the Y direction from the axis of the pivot shaft section 36 on the edge 15b (D0) side illustrated in FIG. 7A to the switch 30 is approximately 35 mm. The distance Db in the Y direction from the axis of the other pivot shaft section 37 to the switch 30 is approximately 20 mm. It goes without saying that the dimensions described above and the dimensions to be described later are merely examples, and can be changed as appropriate.

First, in the non-load state illustrated in FIG. 7A, that is, in a state in which the sensor board 22 is not depressed, the sensor board 22 and the housing 24 are at the most elevated position in the Z1 direction due to a reaction force from the switch 30 and an urging force of each of the elastic members 44 and 45.

In one or more embodiments, the load required to turn on the switch 30, that is, the load which crushes the switch 30 comprised of a metal dome switch is, for example, 180 gf (approximately 1.765 N). The total elastic force of the two elastic members 44 is, for example, 16 gf (approximately 0.157 N). The total elastic force of the two elastic members 45 is, for example, 88 gf (approximately 0.863 N). It goes without saying that the loads described above and the loads to be described later are merely examples, and can be changed as appropriate.

Next, the operation of depressing the button regions R1 to R3 from the state illustrated in FIG. 7A will be described.

Here, as illustrated in FIG. 7B, a description will be made about a case in which a position P1 at a distance do from the edge 15b (D0) is depressed with a finger F1 which is a thumb, for example. The position P1 is located closer to the pivot shaft section 36 side (Y2 side) than the switch 30 and is located at a position included in the button regions R1 to R3 here. In this case, the pivot shaft section 37 on the Y1 side serves as a rotating shaft, and the sensor board 22 and the housing 24 are rotated so that the switch 30 is depressed. At this time, the shaft 36a of the pivot shaft section 36 on the Y2 side moves away from the bearing part 36b in the Z2 direction, and the edge 15b of the sensor board 22 moves down toward the Z2 side. That is, the contact surface 36a1 is separated from the support surface 36b1, and a gap is formed therebetween. In one or more embodiments, the distance do is, for example, 7 mm. Further, the distance d1 from the axis of the pivot shaft section 37 serving as the rotating shaft to the position P1 is, for example, 50 mm.

As a result, the touch pad 15 generates, for example, a load 66 gf (approximately 0.647 N) when the position P1 included in the button regions R1 to R3 is depressed. Thus, in the touch pad 15 according to one or more embodiments, the load required to depress the switch 30 becomes, for example, 66 gf when the position P1 is depressed. As also illustrated in FIG. 8, considering that the pointing stick 20 is operated with the thumb while operating the pointing stick 20 with the index finger or middle finger, the load generated at each position in and near the button regions R1 to R3 may be set to a range of, for example, 50 gf to 120 gf (approximately 0.490 N to 1.177 N).

Next, the operation of depressing the click region R4 from the state illustrated in FIG. 7A will be described.

Here, as illustrated in FIG. 7C, a description will be made about a case in which a position P2 at a distance d10 from the edge 15c (D4) is depressed with, for example, a finger F2 as the index finger. The position P2 is located closer to the pivot shaft section 37 side (Y1 side) than the switch 30 and is located at a position included in the click region R4 here. In this case, the pivot shaft section 36 on the Y2 side serves as a rotating shaft and the sensor board 22 and the housing 24 are rotated so that the switch 30 is depressed. At this time, the shaft 37a of the pivot shaft section 37 on the Y1 side moves away from the bearing part 37b in the Z2 direction, and the edge 15c of the sensor board 22 moves down toward the Z2 side. That is, the contact surface 37a1 is separated from the support surface 37b1, and a gap is formed therebetween. In one or more embodiments, the distance d10 is, for example, 5 mm. Further, the distance d11 from the axis of the pivot shaft section 36 serving as the rotating shaft to the position P2 is, for example, 60 mm.

As a result, the touch pad 15 generates, for example, a load 150 gf (approximately 1.471 N) when the position P2 included in the click region R4 is depressed. Thus, in the touch pad 15 according to one or more embodiments, the load required to depress the switch 30 becomes, for example, 150 gf when the position P2 is depressed. As also illustrated in FIG. 8, considering that the pointing stick 20 is operated with the index finger, the load generated at each position in and near the click region R4 may be set to a range of, for example, 140 gf to 190 gf (approximately 1.373 N to 1.863 N).

Next, a description will be made about a case in which the switch 30 is depressed from directly above from the state illustrated in FIG. 7A.

Here, as illustrated in FIG. 7D, a case will be described in which the position P3 which overlaps the center of the switch 30 in the Z direction and is included in the region R5 is depressed with the finger F2, which is the index finger, for example. In this case, neither of the two pivot shaft sections 36 and 37 acts as a rotating shaft, and the sensor board 22 and the housing 24 are displaced substantially parallel to the Z2 direction, and the switch 30 is depressed. At this time, in the respective pivot shaft sections 36 and 37, the shafts 36a and 37a thereof are both separated from the bearing parts 36b and 37b in the Z2 direction. That is, the contact surfaces 36a1 and 37a1 are separated from the support surfaces 36b1 and 37b1 respectively, and a gap is formed between them.

As a result, the touch pad 15 generates, for example, a load 184 gf (approximately 1.084 N) when the position P3 is depressed. Thus, in the touch pad 15 according to one or more embodiments, the load required to depress the switch 30 becomes 184 gf when the position P3 is depressed. As also illustrated in FIG. 8, the load generated at each position of the click region R5 is, for example, in the range of 80 gf to 240 gf (approximately 0.785 N to 2.354 N) because the switch 30 is directly subjected to the crushing load and the elastic force of each of the elastic members 44 and 45. Therefore, as illustrated in FIG. 8, the region R5 has a peak load (approximately 240 gf) generated between D2 and D3 as a boundary. When the pivot shaft section 36 side is depressed beyond this, a larger load than in the regions R1 to R3 is generated. When the pivot shaft section 37 side is depressed, a larger load than in the region R4 is generated.

As described above, the touch pad 15 of one or more embodiments has the two pivot shaft sections 36 and 37 which rotatably support the housing 24 in the state that it can be displaced in the Z direction toward the base member 26. These pivot shaft sections 36 and 37 are arranged in the positions where they straddle the switch 30 between them in the Y direction from the edge 15b to the edge 15c of the sensor board 22. Further, when the region of the sensor board 22 closer to the pivot shaft section 36 side than the switch 30, for example, the regions R1 to R3 are depressed, the pivot shaft section 37 on the opposite side serves as the rotating shaft and the housing 24 is rotated to depress the switch 30, whereby a first load (for example, 66 gf) is generated. On the other hand, when the region of the sensor board 22 closer to the pivot shaft section 37 side than the switch 30, for example, the region R4 is depressed, the pivot shaft section 36 on the opposite side serves as the rotating shaft and the housing 24 is rotated to depress the switch 30, whereby a second load (for example, 150 gf) larger than the first load is generated.

Thus, in the touch pad 15 of one or more embodiments and the electronic apparatus 10 equipped with the same, the pivot shaft section acting as the rotating shaft is switched and the generated load changes, depending on the operating position of the touch pad 15 in the direction along one direction. Thereby, the touch pad 15 is capable of making the load of the depressing operation in the regions R1 to R3 near the edge 15b smaller than the load of the depressing operation in the region R4 near the edge 15c on the opposite side, for example. As a result, the touch pad 15 can reduce the operating load in the regions R1 to R3 where depressing operations with a light load are desired in order to cooperate with the pointing stick 20, for example. On the other hand, in the region R4 on the opposite side, an appropriate operating load can be generated, and operability is improved. Of course, the touch pad 15 may be configured such that the operating load in the regions R1 to R3 on the edge 15b side is larger than the operating load in the region R4 on the edge 15c side, depending on its application.

In particular, the electronic apparatus 10 which is the laptop PC includes the touch pad 15 located in the position lined up with the palm rest with which the user contacts the palm of the hand. Therefore, when operating the keyboard 18, there is a possibility that the region R4 on the front side (Y1 side) of the sensor board 22 is unintentionally depressed down with the palm of the hand or the like. In this regard, since the touch pad 15 has a suitably heavy operating load in this region R4 and its periphery, it is possible to suppress the occurrence of unintentional erroneous operations as described above. On the other hand, since the operating load in the regions R1 to R3 on the back side (Y2 side) where the possibility of the erroneous operation is low, is made light, the touch pad 15 can be easily depressed down even with, for example, the thumb as described above.

The touch pad 15 is effective even if it has a configuration which is not installed together with the pointing stick 20. That is, it is also effective to assign, for example, a launcher function of a predetermined application to the regions R1 to R3 on the back side (Y2 side) where the possibility of erroneous operations is low. Then, for example, while operating the keyboard 18, a desired application can be started with a light operating load using the thumb. Of course, the direction in which the pivot shaft sections 36 and 37 in the touch pad 15 are arranged and the direction in which the load changes are not limited to the Y direction, but may be configured according to the installation posture and purpose of the touch pad 15. For example, the pivot shaft sections 36 and 37 and the load changes may be along the X direction.

In the touch pad 15 according to one or more embodiments, at least when the region which vertically overlaps with the switch 30 of the sensor board 22, for example, the region R5 which is at the position P3 and its vicinity is depressed, neither of the pivot shaft sections 36 and 37 acts as the rotating shaft. In this case, the sensor board 22 and the housing 24 are displaced in the Z2 direction toward the base member 26, so that the switch 30 is depressed. In this operation, a third load (for example, 184 gf) larger than the first and second loads described above is generated. That is, for example, it is assumed that the region R5 near the center of the sensor board 22 is used less frequently for depressing operations than the regions R1 to R4 near the edges 15b and 15c. Therefore, the operating load in the region R5 is made even larger than in other regions R1 to R4 to enable the occurrence of unintended erroneous operations to be further suppressed and a further improvement in operability.

In the touch pad 15 of one or more embodiments, the distance Da between the switch 30 and the pivot shaft section 36 is larger than the distance Db between the switch 30 and the pivot shaft section 37 based on the Y direction from the edge 15b to the opposite edge 15c (refer to FIG. 7A). Then, when depressing the regions R1 to R3 near the pivot shaft section 36 desired to reduce the operating load, a large moment force generated by the principle of lever can be obtained because the distance Da from the pivot shaft section 36 to the switch 30 is large. On the other hand, when depressing the region R4 near the pivot shaft section 37 desired to make the operating load moderately heavy, the distance Db from the pivot shaft section 37 to the switch 30 is smaller than Da, so that the moment force obtained becomes smaller than when the regions R1 to R3 are depressed. That is, the touch pad 15 can easily change the operating load when each region R1 to R4 is depressed, by simply adjusting the positional relationship between the pivot shaft sections 36 and 37 and the switch 30. As a result, for example, it is possible to miniaturize parts by reducing the elastic force of the elastic members 44 and 45 and it is also possible to omit the elastic members 44 and 45 themselves.

In the touch pad 15, the elastic members 44 and 45 are arranged at the positions to straddle the switch 30 between them in the Y direction and between the pivot shaft sections 36 and 37. Thus, when one of the pivot shaft sections 36 and 37 is switched to act as the rotating shaft, the elastic members 44 and 45 can stably apply a load to the sensor board 22 with elastic forces corresponding to the respective depressing operations. As a result, the touch pad 15 can more easily adjust the operating load when each of the pivot shaft sections 36 and 37 acts as the rotating shaft.

Note that the present invention is not limited to the embodiments described above. It goes without saying that changes can be made freely within the scope not departing from the spirit of the present invention.

Although the pivot shaft sections 36 and 37 are illustrated above as having the configuration in which the shafts 36*a* and 37*a* are supported by the bearing parts 36*b* and 37*b* of the plate pieces, respectively, the configuration of the pivot shaft sections 36 and 37 is not limited to this. For example, various configurations such as a configuration in which the bearing parts 36*b* and 37*b* are formed by elongated holes extending in the Z direction and the shafts 36*a* and 37*a* are slidably and rotatably inserted therein, respectively can be taken. Further, the pivot shaft sections 36 and 37 may be configured such that the shafts 36*a* and 37*a* are provided on the base member 26 and the bearing parts 36*b* and 37*b* are provided on the housing 24.

DESCRIPTION OF SYMBOLS 10 electronic apparatus
12 chassis
15 touch pad
18 keyboard
20 pointing stick
22 sensor board
24 housing
26 base member
30 switch
36, 37 pivot shaft section
44, 45 elastic member

What is claimed is:

1. A touch pad comprising:
a sensor board capable of recognizing a position of manual contact;
a housing to which the sensor board is fixed;
a base member supporting the housing in a state of being capable of ascending and descending the housing; and
a switch depressed when the sensor board is depressed and the housing is moved toward the base member,
wherein the touch pad includes first and second pivot shaft sections provided between the base member and the housing and rotatably supporting the housing in a state of being displaceable in a direction toward the base member,
wherein the first and second pivot shaft sections are arranged at positions straddling the switch between the two in a direction from one edge of the sensor board to the other edge on the side opposite to the one edge,
wherein when a region of the sensor board closer to the first pivot shaft section side than the switch is depressed, the second pivot shaft section servers as a rotating shaft and the housing is rotated to depress the switch, generating a first load, and
wherein when a region of the sensor board closer to the second pivot shaft section side than the switch is depressed, the first pivot shaft section servers as a rotating shaft and the housing is rotated to depress the switch, generating a second load larger than the first load.

2. The touch pad according to claim 1, wherein at least when a region of the sensor board which vertically overlaps with the switch is depressed, the housing is displaced toward the base member to depress the switch without both of the first and second pivot shaft sections acting as a rotating shaft, generating a third load larger than the first and second loads.

3. The touch pad according to claim 1, wherein the distance between the switch and the first pivot shaft section is larger than the distance between the switch and the second pivot shaft section on the basis of the direction from the one edge to the other edge on the opposite side.

4. The touch pad according to claim 3, comprising:
first and second elastic members urging the housing in a direction to relatively separate the housing relative to the base member,
wherein the first and second elastic members are arranged at positions to straddle the switch between the two in the direction from the one edge of the sensor board to the other edge on the side opposite to the one edge and between the first and second pivot shaft sections.

5. An electronic apparatus comprising:
a chassis; and
a touch pad supported by the chassis,
wherein the touch pad includes:
a sensor board capable of recognizing a position of manual contact;
a housing to which the sensor board is fixed;
a base member supported by the chassis and supporting the housing in a state of being capable of ascending and descending the housing; and
a switch depressed when the sensor board is depressed and the housing is moved toward the base member,
wherein the touch pad includes first and second pivot shaft sections provided between the base member and the housing and rotatably supporting the housing in a state of being displaceable in a direction toward the base member,
wherein the first and second pivot shaft sections are arranged at positions straddling the switch between the two in a direction from one edge of the sensor board to the other edge on the side opposite to the one edge;
wherein when a region of the sensor board closer to the first pivot shaft section side than the switch is depressed, the second pivot shaft section servers as a rotating shaft and the housing is rotated to depress the switch, generating a first load; and
wherein when a region of the sensor board closer to the second pivot shaft section side than the switch is depressed, the first pivot shaft section servers as a rotating shaft and the housing is rotated to depress the switch, generating a second load larger than the first load.

6. The electronic apparatus according to claim 5, wherein on the basis of the direction from the one edge to the other edge on the opposite side, the first pivot shaft section is arranged at a position closer to the one edge than the other edge, and the second pivot shaft section is arranged at a position closer to the other edge than the one edge,
wherein the electronic apparatus further includes a keyboard supported by the chassis and adjacent to the one edge of the sensor board, and
a pointing stick which is provided on the keyboard and performs manual pointing operations, and wherein the region of the sensor board closer to the first pivot shaft section side than the switch is assigned a function associated with the pointing stick.

* * * * *